(12) United States Patent
Dawsey et al.

(10) Patent No.: US 7,479,723 B2
(45) Date of Patent: Jan. 20, 2009

(54) PERMANENT MAGNET MACHINE ROTOR

(75) Inventors: Robert T Dawsey, Torrance, CA (US); Constantin C. Stancu, Anaheim, CA (US); Eric R. Ostrom, Bellflower, CA (US); Young Doo, La Palma, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/668,910

(22) Filed: Jan. 30, 2007

(65) Prior Publication Data

US 2008/0179980 A1 Jul. 31, 2008

(51) Int. Cl.
*H02K 1/27* (2006.01)
(52) U.S. Cl. .................................. 310/156.57; 310/91
(58) Field of Classification Search ............ 310/156.08, 310/156.61, 156.53, 53, 261, 217, 156.56, 310/156.57, 156.81, 91; 623/17.15
See application file for complete search history.

(56) References Cited

U.S. PATENT DOCUMENTS

| | | | |
|---|---|---|---|
| 4,454,438 A * | 6/1984 | Yamashita et al. .......... 310/162 |
| 5,378,953 A * | 1/1995 | Uchida et al. .......... 310/156.59 |
| 5,463,262 A * | 10/1995 | Uchida ................... 310/156.61 |
| 5,581,140 A * | 12/1996 | Futami et al. .......... 310/156.53 |
| 5,731,643 A * | 3/1998 | Avakian et al. ............... 310/53 |
| 6,548,932 B1 * | 4/2003 | Weiglhofer et al. ..... 310/156.19 |
| 6,674,205 B2 | 1/2004 | Biais ..................... 310/156.53 |
| 6,906,444 B2 * | 6/2005 | Hattori et al. .......... 310/156.53 |
| 6,956,311 B2 * | 10/2005 | Hosaka ................... 310/156.38 |
| 7,205,694 B2 * | 4/2007 | Mecrow ..................... 310/168 |
| 2003/0052561 A1 | 3/2003 | Rahman et al. ........ 310/156.56 |
| 2003/0164655 A1 | 9/2003 | Biais ..................... 310/156.53 |
| 2003/0173852 A1 | 9/2003 | Biais ..................... 310/156.43 |
| 2007/0055378 A1 * | 3/2007 | Ankney et al. ........... 623/17.15 |

* cited by examiner

*Primary Examiner*—Tran Nguyen

(57) ABSTRACT

A rotor for an interior permanent magnet machine has a rotor body having an output shaft and a first cavity filled with magnetic material. Second cavities are disposed inboard of the first cavities and are not filled with magnetic material. Non-magnetic rods extend through the second cavities and protrude beyond end faces of the rotor body. The rods are press-fit in blind bores formed in non-magnetic end plates disposed adjacent the end faces of the rotor body. Shrink disks are shrunk around projecting ends of the output shaft in abutting relation with the end plates. In order to prevent induced voltage from generating current in the cage formed by the rods and end plates, an oxide layer is disposed between the rods and blind bores in the end plates.

7 Claims, 3 Drawing Sheets

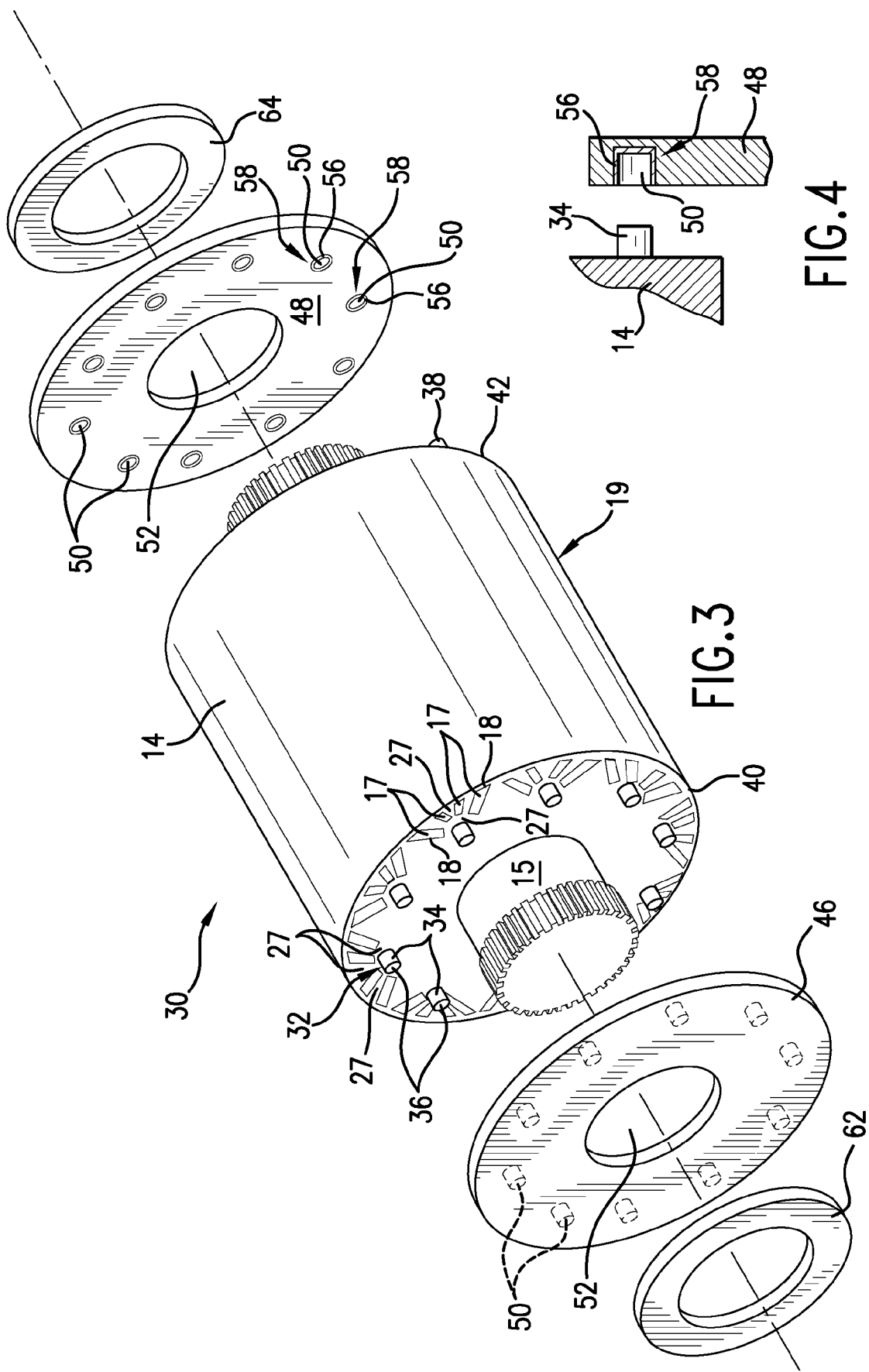

PERMANENT MAGNET MACHINE ROTOR

FIELD OF THE INVENTION

The present invention relates generally to electric or hybrid electric vehicle propulsion systems. More specifically, the present invention relates to the design of electric traction motors or machines for use in electric or hybrid vehicles.

BACKGROUND OF THE INVENTION

In today's automotive market, there exists a variety of electric propulsion or drive technologies used to power vehicles. The technologies include electric traction motors such as DC motors, AC induction motors, switched reluctance motors, synchronous reluctance motors, brushless DC motors, permanent magnet synchronous motors (PMSM) and corresponding power electronics. PMSM motors are of particular interest for use as traction motors in an electric vehicle because of their superior performance characteristics, as compared to regular DC motors and AC induction motors. PMSM motors typically operate with a permanent magnet rotor. A permanent magnet rotor may be configured as a surface mount or interior or buried permanent magnet rotor. An interior permanent magnet (IPM) motor or machine has performance attributes, when compared to regular DC motors and AC induction motors, that include relatively high efficiency, relatively high torque, relatively high power densities, and a long constant power operating range which make an IPM motor attractive for vehicle propulsion applications.

Permanent magnets buried inside a rotor of a PMSM motor exhibit high reluctance directly along the magnetic axis or the d-axis due to the low permeability of the permanent magnets. While along the q-axis, between the magnetic poles or magnet barriers of an IPM rotor, there exists no magnetic barrier, and reluctivity to magnetic flux is very low. This variation of the reluctance around the rotor creates saliency in the rotor structure of an IPM machine. Therefore, the IPM rotors have reluctance torque in addition to the permanent magnet torque generated by the magnets buried inside the rotor.

The magnets in the motor are arranged in several layers creating a multi-barrier design. The multi-barrier design reduces leakage and improves the rotor saliency. Accordingly, motors having multi-barrier rotors have numerous performance advantages over a single barrier rotor designs, including relatively high overall efficiency, extended high-speed constant power operating range, and improved power factor. Reducing dependency on magnetic torque helps lower the number of magnets or amount of magnetic material in an IPM machine, as compared to a single barrier IPM machine or surface mounted permanent magnet machine. The amount of magnetic material needed to generate a specific torque and wattage rating depends on the level of saliency of the rotor. The higher the rotor saliency, the lower the magnet material usage for the same overall machine performance. Electric motors having a multi-barrier rotor design, as compared to single barrier design, generate higher rotor saliency.

The reduction of magnetic material in an electric motor rotor is desirable from a cost standpoint. Consequently, deep cavities are generally left empty as their contribution to the rotor magnetic field should they be filled is relatively small. The reason for this is the relative distance to the motor airgap. A pure synchronous reluctance motor that has similar rotor geometry to the multi-barrier permanent magnet (PM) design, but no magnetic material in the rotor, is a relatively low performance machine. Multi-barrier IPM electric motors have the beneficial attributes of both synchronous reluctance machines and the permanent magnet machine and are therefore excellent candidates for vehicle propulsion. A major difficulty involved with IPM machines is the design and manufacture of the rotor.

SUMMARY OF THE INVENTION

In view of the aforementioned considerations, the present invention is directed to a rotor for an interior permanent magnet machine comprising a cylindrical body of non-magnetic material having an axial shaft projecting therefrom, the cylindrical body having first and second ends and a cylindrical outer surface. An array of first cavities are disposed in the rotor, which first arrays contain permanent magnets, and array of second cavities are disposed in the rotor that do not contain magnets. The cavities are separated by rotor bridges comprised of the rotor material. An array of rods of non-magnetic material extend through the second cavities in the rotor and are fixed to first second end plates that are disposed adjacent to the first and second ends of the rotor.

In a further aspect of the rotor, at least one of the end plates has an insulating oxide layer between the rods and end plate.

In still a further aspect of the rotor, the rods and end plates are made of stainless steel or titanium.

In still a further aspect of the rotor, the rods have end protrusions that are received in blind bores in the end plates, which end plates are held adjacent to the ends of the rotor.

In still a further aspect of the rotor, annular shrink disks are shrunk over ends of the output shaft outboard of the end plates to retain the end plates.

In another aspect of the rotor, the first cavities are arranged in groups adjacent to the second cavities with a plurality of first cavities extending obliquely away from the second cavities toward the outer cylindrical surface of the rotor.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a perspective exploded view similar to FIG. 2 but showing rods inserted into the rotor for fixing to annular end plates rings;

FIG. 4 is an elevation of a portion of the annular end plate with a blind hole aligned with an end of a rod.

DETAILED DESCRIPTION

Figure 1:
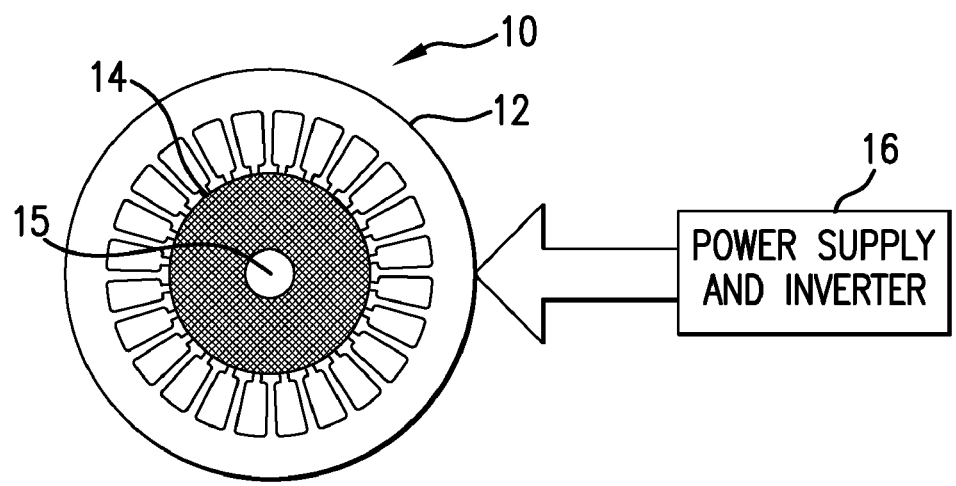
FIG. 1 is a diagrammatic cross-sectional drawing of a permanent magnet motor.

FIG. 1 is a diagrammatic drawing of a permanent magnet motor 10 having a wound stator 12 and permanent magnet rotor 14, which has an output shaft 15 integral therewith. A power supply and inverter 16 commutate and control the speed and torque of the motor 10 in response to feedback including, but not limited to, an encoder, resolver, tachometer, proximity switch tooth set, and back emf detection. The motor 10 may be characterized as a brushless DC motor with square wave or sinewave excitation provided by the power supply and inverter 16.

Figure 2:
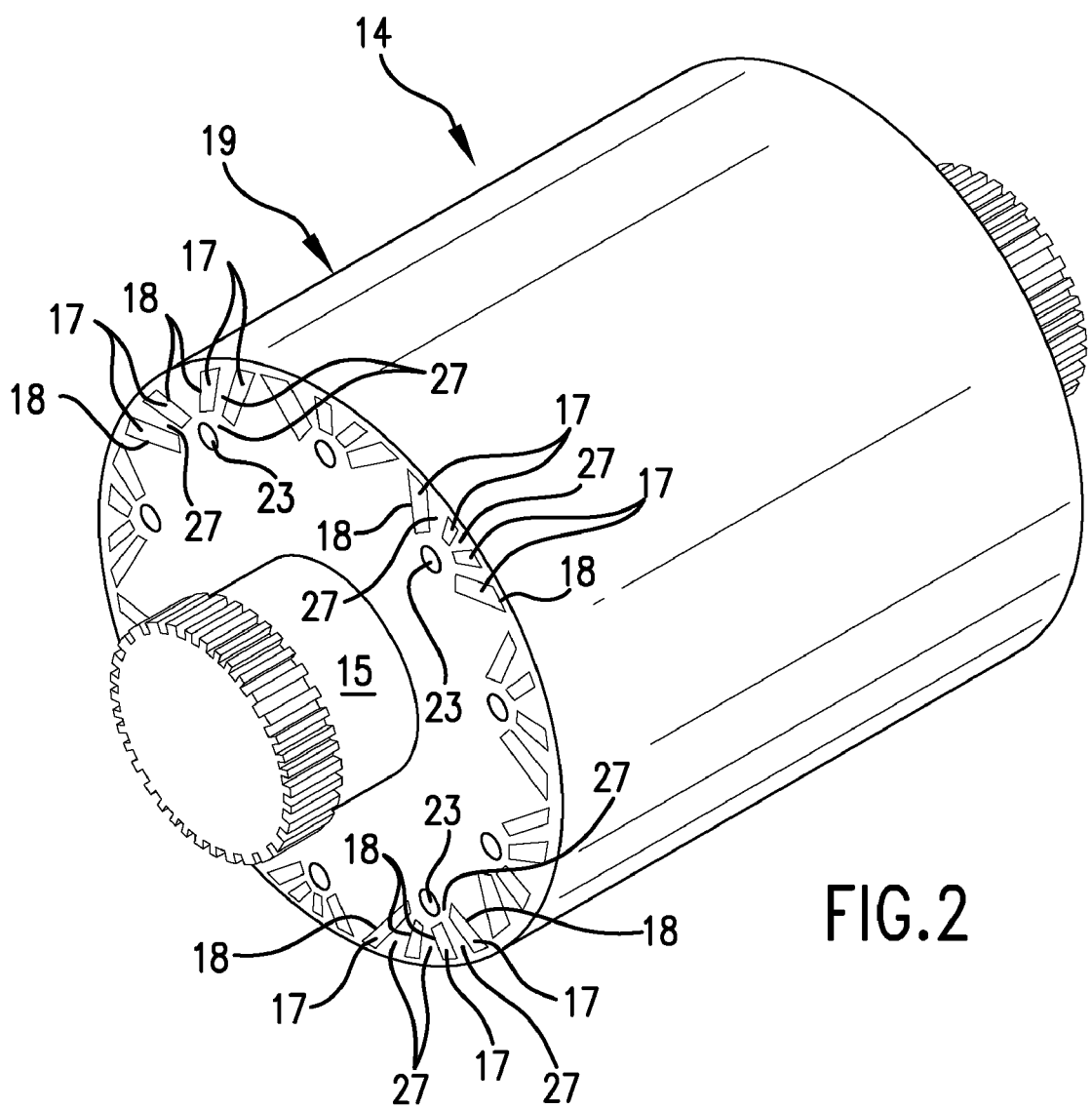
FIG. 2 is a perspective view of a rotor having empty cavities inboard of cavities having magnetic inserts.

FIG. 2 is a permanent magnet rotor 14 of non-magnetic material with magnetic material 17 buried in cavities 18 near the surface 19 of the rotor 14. The magnetic material 17 because of its position proximate to the rotor 14 surface may be magnetized by a magnetizing fixture or the wound stator 12 (FIG. 1) during a post-magnetization process.

Inboard of the first cavities 18 that are filled with magnetic material 17 to establish rotor barriers, are second rotor cavities 23 which are empty. The presence of empty cavities (or barriers) 23 inside rotor structure can create structural problems inside the rotor 14 as the rotor spins at high angular speeds that result in a high levels of material stress mostly in non-magnetic rotor material bridges 27 between rotor barriers 18 and empty cavities 23.

A simple solution to the mechanical stress problem would appear to make the rotor bridges 27 thicker. However, this approach diminishes the torque producing performance of the motor 10 in two ways. First, the permanent magnet flux is reduced as the bridges 27 "short-circuit" the magnets 17 residing in the adjacent cavity 18, and secondly, the saliency characteristics of the rotor 14 are degraded. Moreover, motor torque density suffers because permanent magnet flux "leaks" through the thick bridges 27 at magnet edges. Consequently, if the same motor torque density is desired, more expensive, higher strength magnet material 17 is needed to compensate for the flux leakage.

Multi-layer or barrier geometry for an IPM rotor improves the rotor 14 saliency. Accordingly, the rotor 14 geometry of FIG. 2 has the advantage of having relatively high saliency, which improves machine torque density and lowers magnetic material volume requirements for a specific torque or wattage. Lower magnetic material volume requirements lower the motor cost and also alleviate problems associated with high flux PM machines, such as short circuit and open circuit fault problems, and spin losses (eddy current induced losses) due to the presence of a permanent magnet field. Multi-barrier rotor geometries also have the advantage of favorable torque speed profile, with extended constant power range, for vehicle propulsion application.

Magnetic field strength is defined by the magnet remnant flux density $B_r$ and the magnet coercivity $H_c$. $B_r$ is the measure of the magnetic flux density when the two ends of the magnet (magnet north and magnet south) is shorted using a highly permeable magnetic material. $H_c$ is the measure of the field strength that would be required to drive the total flux within the magnet to zero. Magnetic energy product (MEP) is proportional to the product of the magnet remnant flux density and the magnet coercivity, which has a unit of Joules per unit volume. MEP multiplied by the total magnet volume gives the total energy of the magnet formed by the magnetic material. In order to keep the magnet flux unaltered in the air-gap, the MEP is increased by the same proportion as the volume of magnetic material is reduced. Thus, the MEP times the magnet volume will remain substantially unchanged for the rotor geometries.

Actual cost of the magnetic material 17 is a complex function of many factors, such as the type of magnets, chemical composition of the magnetic material, the MEP, magnetic material volume, magnetic material processing requirements, etc. However, by reducing the total magnetic material volume while keeping the MEP multiplied by the magnetic material volume substantially the same, the overall magnetic material cost can be reduced.

IPM geometries have reluctance torque in addition to magnetic torque due to the permanent magnet field. The reluctance torque is produced due to the variation of rotor 14 saliency with rotor position. This variation of the rotor 14 reluctance with the rotor position produces rotor saliency, which is the source of reluctance torque. When magnetic material 17 is absent from cavities 23 and replaced with non-magnetic material or kept empty, the reluctance of rotor 14 in general does not change. Therefore, the reluctance torque is mostly unchanged. When the removal of magnetic material 17 is compensated by increasing the MEP of the rotor magnets or barriers 27 formed by the magnetic material 17, the motor torque is substantially unaltered.

Referring now to FIG. 3 where a rotor structure 30 in accordance with the present invention assembly is shown, an array 32 of rods 34 extends through the previously empty cavities 23 of FIG. 2. The rods 34 have protruding end portions 36 and 38 which protrude from first and second ends 40 and 42 of the rotor 14. The rods 34 are made of a non-magnetic material, such as but not limited to stainless steel or titanium, which is not permeable to magnetic flux and therefore do not affect the magnet state of the rotor 14.

First and second annular end plates 46 and 48, each having blind holes 50 therein aligned with the protruding end portions 36 and 38 of the rods 34. The end plates 46 and 48 each have center openings 52 that receive the output shaft 15 of the rotor 14.

The rods 34 are placed at a location in the rotor 14 where the magnetic flux is low compared to the rest of the rotor 14, however there is a small component of the magnetic flux at the fundamental electrical frequency of the motor 10. This flux is enough to induce a voltage in the circuit formed by two adjacent rods 34 and the end plates 46 and 48. According to calculations performed on a 400 mm long rotor 14 with a 250 mm OD spinning at 12,000 rpm, a voltage of about 2V peak is produced.

Because of the low impedance of the circuit formed by the two adjacent rods 34, the current generated by the induced voltage can be very large. This current will not generate any torque in the motor 10 because it has the same frequency as the main motor field, however it can generate unwanted loses in the cage formed by the rotor rods 34, losses which in turn will reduce the efficiency of the motor 10. For this reason, at least one of the end plates 46 or 48 has an insulating oxide layer 56 applied in the region 58 mating with the rods, as is seen in FIG. 4. In this way, a closed loop of two adjacent rods 34 is open and very little or no loss-generating current is able to circulate.

A pair of annular shrink disks 62 and 63 having central openings 64 align with opposite ends of the output shaft 15 to help hold the end plates 46 and 48 in press-fit relation with ends 36 and 38 of the rods 34.

Figure 5:
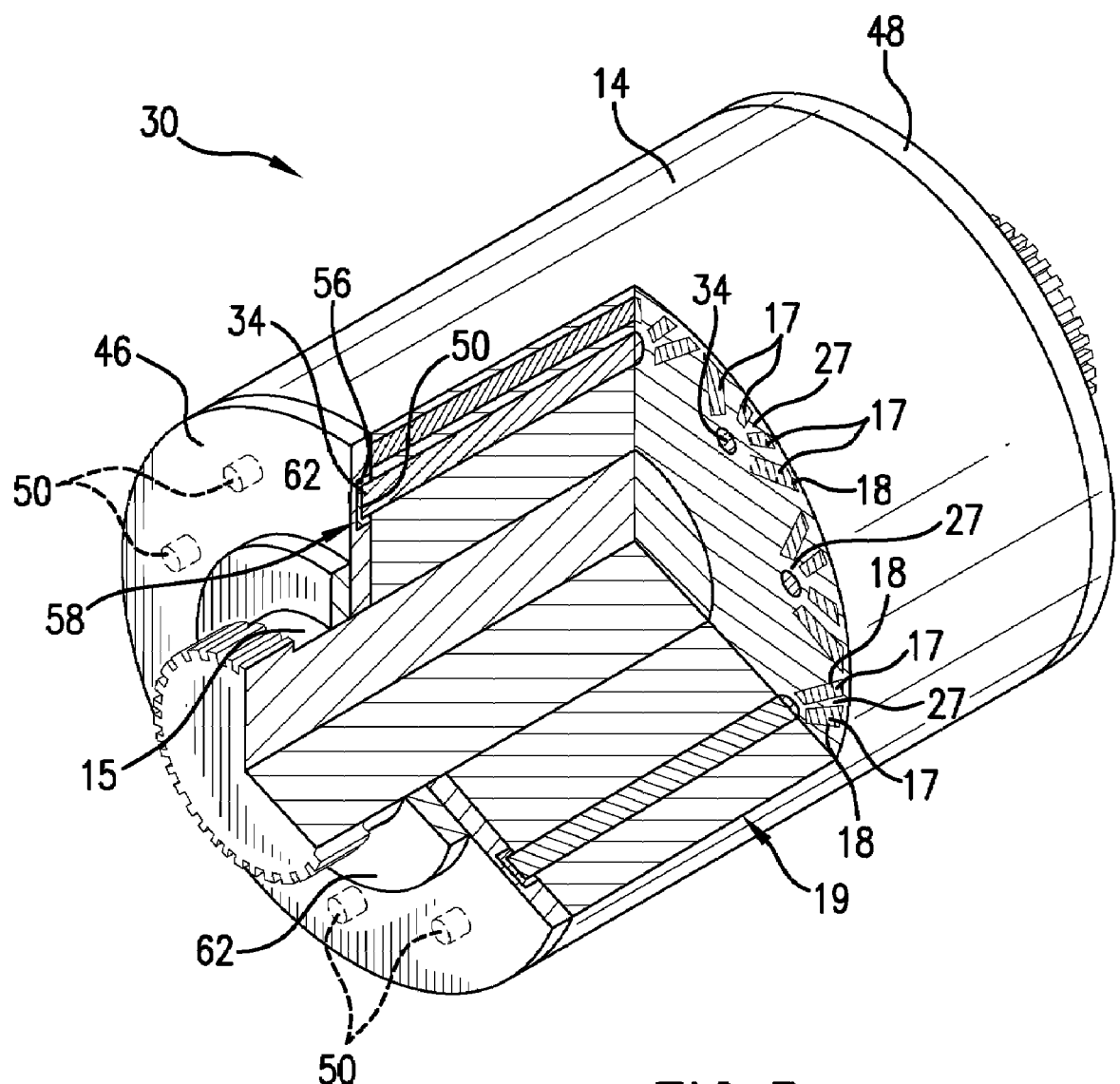
FIG. 5 is a perspective view partially cut away of the rotor of FIG. 3 assembled.

Referring now to FIG. 5, the rotor structure 30 is shown assembled upon press-fitting the end portions 36 and 38 of the rods 34 into the blind holes 50 in the end plates 46 and 48 and upon shrink fitting the shrink disks 62 and 64 on the output shaft 15.

By inserting the rods 34 in the rotor empty barriers or cavities 32 and connecting them to the end pates 46 and 48, a structural cage is developed inside the rotor 14. Consequently, the stress levels in the rotor bridges 27 are reduced and deformations of the rotor bridges are diminished as well.

As is seen in FIG. 5 as well as FIGS. 2-4, the first cavities 18 filled with magnetic material 17 are arranged in groups that extend outwardly from the second cavities 23 containing the rods 34 in directions extending obliquely toward the outer peripheral surface 19 of the rotor 14.

While this invention has been described in terms of specific embodiments, it will be appreciated that other forms can readily be adapted by one skilled in the art. Accordingly, the scope of this invention is to be considered limited only by the following claims.

From the foregoing description, one skilled in the art can easily ascertain the essential characteristics of this invention, and without departing form the spirit and scope thereof, can make various changes and modifications of the invention to adapt it to various usages and conditions.

We claim:

1. A rotor for an interior permanent magnet machine, comprising:
    a cylindrical body comprising non-magnetic material having an axial shaft projecting therefrom, the cylindrical body having first and second ends and a cylindrical outer surface;
    an array of first cavities therein containing permanent magnets and array of second cavities therein that do not contain magnets, the cavities being separated by rotor bridges comprising the non-magnetic material, wherein the array of first cavities are distributed adjacent to each other at a first radial distance from the axial shaft and the second set of cavities are located at a second radial distance from the axial shaft, and wherein the first radial distance is greater than the second radial distance;
    an array of rods of non-magnetic material extending through the second cavities in the rotor, and first and second end plates disposed adjacent the first and second ends of the rotor and fixed to the array of rods;
    wherein at least one of the end plates has an insulating oxide layer between the rods and end plate.

2. The rotor of claim 1, wherein the rods and end plates are made of stainless steel or titanium.

3. The rotor of claim 2, wherein the rods have end protrusions that are received in blind bores in the end plates and wherein the end plates are held adjacent to the ends of the rotor.

4. The rotor of claim 2, wherein the rods have first and second end protrusions protruding beyond the first and second ends of the rotor and wherein the end plates have blind bores therein, in which blind bores the end protrusions of the rods are retained by press-fit.

5. The magnetic machine rotor of claim 4, wherein shrink disks are shrunk over ends of the output shaft outboard of the end plates.

6. The magnetic machine rotor of claim 4, wherein the first cavities are arranged in groups adjacent to the second cavities with a plurality of first cavities extending obliquely away from the second cavities toward the outer cylindrical surface of the rotor.

7. The magnetic machine rotor of claim 1, wherein the first cavities are arranged in groups adjacent to the second cavities with a plurality of first cavities extending obliquely away from the second cavities toward the outer cylindrical surface of the rotor.

* * * * *